United States Patent [19]
Yale et al.

[11] Patent Number: 5,103,428
[45] Date of Patent: Apr. 7, 1992

[54] METHOD FOR OPTIMIZING WELL PRODUCTION RATES

[75] Inventors: David P. Yale, Dallas; Ibrahim S. Abou-Sayed, Plano; Christopher V. Chow, Dallas, all of Tex.

[73] Assignee: Mobil Oil Corporation, Fairfax, Va.

[21] Appl. No.: 641,963

[22] Filed: Jan. 16, 1991

[51] Int. Cl.$^5$ .................................................. G01V 1/40
[52] U.S. Cl. ........................................ 367/27; 367/35;
367/86; 181/102; 175/40; 73/153
[58] Field of Search ................... 367/14, 25, 27, 35,
367/73, 86; 181/102, 105; 175/40, 44, 50;
73/153

[56] References Cited

U.S. PATENT DOCUMENTS

| | | | |
|---|---|---|---|
| 3,246,290 | 4/1966 | McClure | 367/35 |
| 4,742,496 | 5/1988 | Jennings et al. | 367/86 |
| 4,802,145 | 1/1989 | Mount | 367/35 |
| 4,926,942 | 5/1990 | Profrock | 166/250 |

OTHER PUBLICATIONS

Cleary et al., "The Effect of . . . Unconsolidated Sands"; 54th Ann. SPB of AIME Tech. Conf., 9/26/79, 12 pp; SPA-8426.

*Primary Examiner*—Nelson Moskowitz
*Attorney, Agent, or Firm*—Alexander J. McKillop; Charles J. Speciale; George W. Hager, Jr.

[57] ABSTRACT

A method and apparatus for laboratory simulation of the dynamic formation of sand arches in production of oil and/or gas from unconsolidated or poorly consolidated wells is disclosed. An ultrasonic transducer is disposed opposite a perforation in a member simulating the casing of a well and the simulated well is operated at conditions approximating those of interest in the field. The acoustic transducer is moved incrementally across the perforation and measurements of the distance between the transducer and the formation are measured. These can then be used to generate a profile of the surface of the formation behind the perforation. Preferably, an ultrasonic transducer which emits a focussed beam of acoustic energy is employed.

7 Claims, 2 Drawing Sheets

METHOD FOR OPTIMIZING WELL PRODUCTION RATES

FIELD OF THE INVENTION

This invention relates to a method for optimizing production of oil and/or gas from unconsolidated or poorly consolidated sand formations. More particularly, this invention relates to a research tool for determining the conditions under which so-called "sand arches" are likely to form, so that movement of sand into the wellbore can be avoided.

BACKGROUND OF THE INVENTION

Many highly productive oil and gas fields are found in unconsolidated or poorly consolidated rock formations, that is, rock formations in which the individual grains of sand making up the rock formation have not yet become cemented together by the passage of time. Wells in these formations are normally "cased" by lining them with steel pipe. The casing is "perforated" by detonation of an explosive charge or the like within the pipe so as to form orifices in the casing at the depths where it is anticipated that oil and gas will be usefully recovered.

It is well known that in such cases some quantity of the unconsolidated sand tends to flow into the well with the oil and gas. This causes damage to equipment and also necessitates that the sand be removed from the oil or gas which is produced. Furthermore, excessive sand production can cause the entire formation to collapse, necessitating that the well be cleaned out and, in many cases, that it be packed with "gravel", a relatively coarser sand which then acts as a kind of filter. However, such methods are complex and expensive to perform.

The art has realized for some time that when oil and gas are produced from an unconsolidated formation, a so-called "sand arch" can form outside the perforation. When this occurs, sand in the immediate vicinity of the perforation is drawn into the casing, together with the oil and/or gas being produced, leaving a void behind the casing. The void may resemble an arch centered opposite the perforation. The amount of sand flowing into the well is a function of the surface area through which the oil and gas flow. That is, sand is produced when the force exerted due to the viscosity of the oil and gas flowing around the grains of sand is higher than the force holding the formation together, so that the sand tends to flow into the well with the oil and gas.

When a sand arch grows to sufficient size, that is, when a sufficiently large cavity is formed behind the perforation, a metastable condition can result. In this condition, the surface area of the cavity is relatively large compared to the area of the orifice of the perforation. As the cavity grows, the force per unit area exerted on the sand by the flowing oil or gas is reduced until it is equal to the force holding the formation together, so that the structure is relatively stable. However, it will be apparent to those of skill in the art that if the production rate is then increased, as is normally desirable, the sand will tend to be produced and, as noted above, the formation may indeed collapse. It is therefore desirable to produce oil and gas from wells in such unconsolidated or poorly consolidated formations at rates which will not lead to excessive production of the sand and which will allow sand arches, if they form, to be relatively stable.

There is at present no method or apparatus known for determining the size and shape of sand arches. Because they form while the well is being produced, it is difficult if not impossible to generate a meaningful static model. To the knowledge of the present inventors, no method is available in the published art for modeling the formation of sand arches in the laboratory in order to determine the maximum rate at which a well in a particular formation can be produced. It would be desirable to provide an apparatus and technique for laboratory modeling the dynamic production of oil and gas from poorly consolidated formations. In particular, it would be desirable to provide experimental techniques and equipment for monitoring the growth of sand arches, so as to be able to determine for later field use the maximum production rates which are tolerable without excessive production of sand.

OBJECTS OF THE INVENTION

Accordingly, it is an object of the invention to devise a method and apparatus for simulation of production conditions which can lead to excessive production of sand, in order to monitor the dynamic formation of sand arches, and to determine the maximum rate at which the well can be produced without excessive sand production.

It is a further object of the invention to provide a tool for use in the field to locate and to image sand arches as they form to enable a determination that the flow rate should be controlled, or that other steps should be taken to reduce or eliminate the formation of sand arches.

SUMMARY OF THE INVENTION

The above objects of the invention and the needs of the art are satisfied by the present invention according to which an experimental apparatus is provided. The experimental apparatus comprises a pressure vessel having a wall therein, dividing the chamber into two smaller chambers. A perforation is formed in the wall. A sample of the formation to be modeled is disposed on one side of the perforation. An ultrasonic transducer is disposed opposite the perforation in the chamber. The transducer is mounted on a device for moving it across the perforation, preferably in two dimensions, and also for moving it controllably toward and away from the perforation. Preferably, the transducer is of the focussing type, that is, it emits a focussed beam of ultrasonic energy.

A mixture of oil, gas and water similar to that expected to be encountered in a field situation of interest is pumped through the sample formation and the perforation at pressures approximating typical field pressures. While the pumping continues, energy is supplied to the ultrasonic transducer, such that it emits pulses of ultrasonic energy. The transducer detects the reflection of the pulse of energy from the formation behind the perforation. The time of flight of the pulses between their emission and their detection by the transducer is measured, and used to determine the distance between the transducer and the formation. The transducer is then moved slightly and the measurement is repeated. When measurements have been taken across the perforation, the collection of distances measured can be used to profile the sand arch, if any, behind the perforation. If a focussed transducer is used, it can also be moved incrementally closer to the perforation. At some spacing, the transducer will be spaced appropriately from the formation such that the focussed beam will be returned with maximal return energy. This provides an additional measure of the distance and also can be useful in determining the shape of the sand arch, if any.

BRIEF DESCRIPTION OF THE DRAWINGS

The invention will be better understood if reference is made to the accompanying drawings, in which.

DESCRIPTION OF THE PREFERRED EMBODIMENTS

Figure 1:
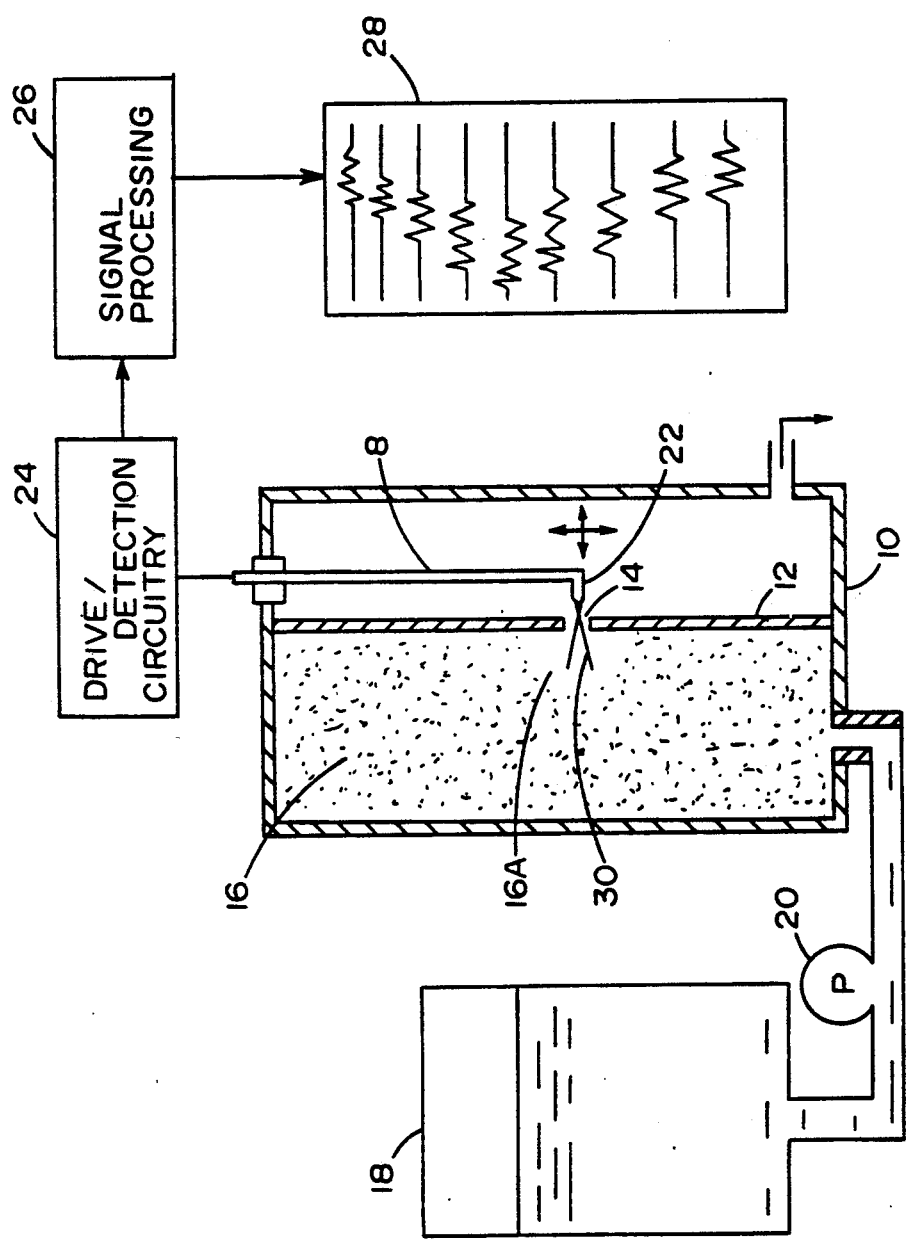
FIG. 1 shows a schematic view of the experimental apparatus.

As indicated in FIG. 1 the experimental apparatus according to the invention comprises a pressure vessel 10. Within the pressure vessel there is disposed a solid member 12 intended to simulate the casing of a typical well, having a perforation 14 formed therein. Typically, the perforation will be on the order of ½ to ¾ of an inch in diameter. On one side of the member 12 is disposed a sample 16 of the formation to be modeled. An appropriate sample of oil, gas and/or water is supplied from a reservoir 18 by a high pressure controllable pump 20 at rates approximating typical production rates and pressures comparable to those found in a field situation of interest.

Disposed on the other side of the perforation is an ultrasonic transducer 22. Preferably, the ultrasonic transducer 22 emits a focussed beam of ultrasonic energy. The transducer 22 is mounted on a structure 8 which allows for controllable movement of the transducer across the perforation 14 and also axially closer to or further away from the perforation. Motion of the transducer is controlled by drive/detection circuitry 24 which is essentially commercially available and is within the skill of the art. The transducer is also driven by this circuitry to emit pulses of ultrasonic energy and to detect their return after reflection from the formation. Experiments to date indicate that 5 MHz is the approximate center of a band of appropriate frequencies; frequencies on the order of 1 MHz do not provide sufficient resolution, and frequencies of approximately 10 MHz and higher tend to be scattered from individual grains of sand, resulting in images which are difficult to interpret.

As is well known, the pulse of energy emitted by the ultrasonic transducer will reflect from the inner wall of the formation, e.g. as indicated at 16a, where a sand arch is shown in schematic form. As discussed above, such sand arches are typically formed when oil and gas are produced from unconsolidated or poorly consolidated formations. The reflected energy is detected by the transducer 22 and the time between emission and detection of a particular pulse is used to derive a direct indication of the distance between the transducer and the formation, that is, the rear wall of the sand arch, if one has formed.

The transducer is then moved across the perforation 14, that is, vertically in FIG. 1, and the measurement is repeated. The transducer can also be moved along one or more orthogonal lines (into and out of the plane of FIG. 1) to image the sand arch in both dimensions. The series of distance measurements thus made can be processed in well-understood fashion by conventional signal processing circuitry 26. A profile of the shape of the sand arch, if any, can be plotted as indicated schematically at 28 and as shown graphically by FIG. 2.

Figure 2:
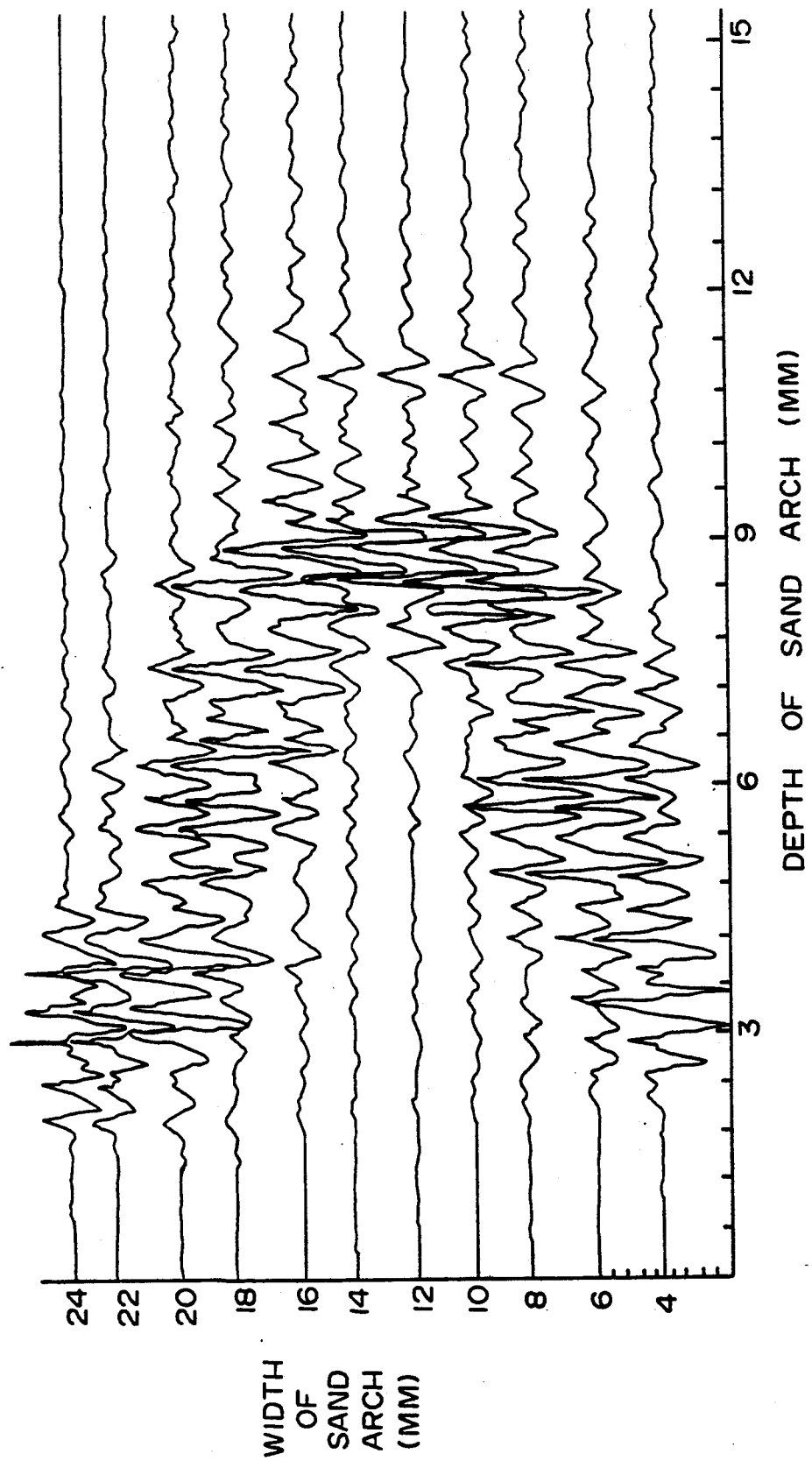
FIG. 2 shows a typical profile generated using the apparatus of FIG. 1.

FIG. 2 depicts actual results of tests performed using an ultrasonic distance measuring apparatus as just described to image a preformed sand arch, that is, of known shape. In this Figure, the vertical axis corresponds to vertical motion of the transducer across the perforation, and the horizontal axis corresponds to the depth of the sand arch. These tests were performed using a focussed transducer having a focal length of 3 inches and an emitting surface of 0.25 inches in diameter, operating at 5 MHz.

As indicated above, preferably the transducer 22 emits a focussed beam of ultrasonic energy. The particular advantage of this is that the beam, as depicted at 30 in FIG. 1, reaches a minimum width such that it passes through the perforation which can be substantially smaller than the overall dimension of the sand arch, i.e. allowing an area of the sand arch broader than the opening of the perforation to be mapped. Further, by incrementally moving the transducer towards or away from the perforation, at some point the perforation will be spaced from the transducer by its focal length. This can be detected by maximal return of the energy. The distance thus measured directly can be used as a check on the distance measurement calculated responsive to the time-of-flight measurement.

According to the preferred method of practice of the invention, a series of experiments are performed, each including measurement of the shape of the sand arches formed at a given flow rate of the oil, gas and/or water mixture through a particular formation of interest. In each of the experiments a profile is generated of typical sand arch formation. The flow rate is then varied and the experiment repeated. The ultimate result is a series of profiles each showing typical sand arch formation sequences as functions of the flow rate in a particular formation. Other variables, such as the relative proportion of the oil, water and gas in the sample, porosity of the formation, pressure in the formation, addition of flow-controlling foams, steam, or other agents, etc., can also be varied to generate additional data.

When it is later desired to drill a well in a similar formation, the "data base" generated by performing such a series of experiments can be consulted to determine the maximum flow rate which can likely be employed for production of oil and gas without excessive formation of sand arches and thus avoidance of production of excessive amounts of sand.

Essentially the same method can also be used to determine whether sand arches have in fact formed in a given well. In this case, normally there will be no variation of production rate. Instead, the method described above in a single experiment can be used to image sand arches, if any, opposite the perforations in the casing of a well. If desired, however, production rates can be varied and the experiment reperformed to determine whether this will reduce or eliminate the formation of sand arches.

The apparatus of the invention is generally within the skill of the art as to the specific ultrasonic transducer, driving and detection apparatus, and signal processing equipment required. Suitable acoustic transducers are available from Panametrics, Inc. of Boston, Mass.; Panametrics also supplies suitable drive/detection circuitry 24 which can be utilized by those of skill in the art to implement the invention without undue experimentation. Digital oscilloscopes are one obvious choice for the signal processing equipment 26. As noted above, experiments to date indicate that approximately 5 MHz appears to be the optimal frequency for conducting such experiments, although some departure from this precise figure will doubtless yield useful results as well.

While a preferred embodiment of the invention has be described in detail, this should not be considered a limitation on the scope of the invention but merely as exemplary thereof. The scope of the invention is to be limited only by the following claims.

We claim:

1. A method for imaging sand arch formation and optimizing well production rates in wells in unconsolidated or poorly consolidated formations, comprising the steps of:
   (1) performing a series of experiments on simulated formations, each consisting of the following steps:
      (a) providing a sample of a formation to be simulated;
      (b) disposing said sample in a pressure vessel, on one side of a solid member having a perforation therein;
      (c) controllably pumping oil and/or gas of a composition typically found in conjunction with said sample through the sample and through the perforation;
      (d) disposing an acoustic transducer in the pressure vessel on the opposite side of the member from the sample, generally opposite the perforation;
      (e) driving the transducer so that it emits one or more pulses of acoustic energy toward the sample;
      (f) detecting reflection of the pulses of acoustic energy from the sample;
      (g) measuring the travel time of the pulses of acoustic energy between their emission and detection;
      (h) calculating the distance of the sample from the transducer;
      (i) moving the transducer incrementally across the perforation, and repeating said steps (e)-(h), and using the accumulated distance measurements to determine the profile of the sample behind the member; and
      (j) varying the pumping rate and repeating said steps (c)-(i), to generate a number of profiles of the sample as functions of the pumping rate;
   (2) determining for a given well the experiment performed employing a simulated formation and oil and/or gas composition most closely corresponding to those of the given well;
   (3) controlling the well production to a rate found in step (1)(j) to yield a particular desired profile.

2. The method of claim 1 wherein said production is controlled to a maximum rate less than any rate which is found in step (1)(j) to result in sand arch formation.

3. The method of claim 1, wherein the acoustic transducer emits focussed pulses of acoustic energy, and in step (1)(i) the transducer is also moved incrementally towards and away from the sample, and the distance from the transducer to the sample is further determined by detection of the maximal energy return.

4. The method of claim 1, wherein the frequency of the acoustic energy emitted by the transducer is approximately 5 MHz.

5. A method of determining well production conditions tending to lead to sand arch formation, comprising the steps of:
   (a) providing a sample of a formation to be simulated;
   (b) disposing said sample in a pressure vessel on one side of a solid member having a perforation therein;
   (c) controllably pumping oil and/or gas of a typical composition found in conjunction with said sample through the sample and through the perforation;
   (d) disposing an acoustic transducer in the pressure vessel on the opposite side of the member from the sample, generally opposite the perforation;
   (e) driving the transducer so that it emits one or more pulses of acoustic energy toward the sample;
   (f) detecting reflection of the pulses of acoustic energy from the sample;
   (g) measuring the travel time of the pulses of acoustic energy between their emission and detection;
   (h) calculating the distance of the sample from the transducer;
   (i) moving the transducer incrementally across the perforation, and repeating said steps (e)-(h), and using the accumulated distance measurements to determine the profile of the sample behind the member; and
   (j) varying the pumping rate and repeating said steps (c)-(i), to generate a number of profiles of the sample as functions of the pumping rate.

6. The method of claim 5, wherein the energy emitted by the acoustic transducer is focussed, and in step (i) the transducer is also moved incrementally towards and away from the sample, and wherein the distance from the transducer to the sample is further determined by detection of the maximal energy return.

7. The method of claim 5, wherein the frequency of the acoustic energy emitted by the transducer is approximately 5 MHz.

* * * * *